Jan. 19, 1971   J. E. GUIDI ET AL   3,556,646
APPARATUS AND METHODS FOR PRODUCING ANIMATED MOTION PICTURES
Filed June 7, 1967   5 Sheets-Sheet 1

INVENTORS
JUAN GUIDI
ARMANDO GUIDI
BY
Popper, Bain & Bobis

ATTORNEYS

Jan. 19, 1971     J. E. GUIDI ET AL     3,556,646
APPARATUS AND METHODS FOR PRODUCING ANIMATED MOTION PICTURES
Filed June 7, 1967     5 Sheets-Sheet 2

INVENTORS
JUAN GUIDI
ARMANDO GUIDI
BY

ATTORNEYS

INVENTORS
JUAN GUIDI
ARMANDO GUIDI 3,556,646
APPARATUS AND METHODS FOR PRODUCING ANIMATED MOTION PICTURES
Juan E. Guidi and Armando A. Guidi, Jamaica, N.Y., assignors to New Dimension Films, Inc., Edgewater Borough, N.J., a corporation of New Jersey
Filed June 7, 1967, Ser. No. 645,103
Int. Cl. G03b 19/18
U.S. Cl. 352—50
17 Claims

ABSTRACT OF THE DISCLOSURE

A method and apparatus for producing photographic animations wherein the illusion of movement in the three planes of space, either simultaneously or selectively, may be achieved by a single sequence of animated images. Like images in each member of the sequence have the same proportional size, but are photographed sequentially at different positions in the three planes of space to generate the illusion of movement, thereby guaranteeing a natural appearance, true reflections and actual and natural shadows while reducing both the time and effort required to produce the animation. Transparent supporting members are used for supporting the images from a jig at different positions for photographing.

FIELD OF INVENTION

The field of our invention is animations generally and specifically, apparatus and methods for producing naturally appearing animations which may comprise either drawings exclusively or mixed drawings and real objects, both fixed and animated. Fundamentally, our process includes preparing a sequence or cycle of drawings including animated objects, photographing each member of the sequence and projecting the individual photograph rapidly and in the same said sequence through any one of a number of well known motion picture projectors to generate the illusion of movement. More specifically, our process includes preparing drawings of animated images, transferring the drawn images to a transparent sheet, attaching a hanger to each sheet at the top edge thereof, severing the sheet proximal to the image on opposite sides thereof to produce a cut or severed image with the hanger attached thereto, positioning the said cut images before a camera and photographing the said severed image while moving the same sequentially to produce a sequence of photographic frames which when projected through a motion picture projector produces an animation.

The illusion of movement is created by varying the position of the images sequentially from frame to frame of the photographic camera. However, in our process, the illusion of movement in depth is generated by varying the distance from the image to the camera lens from frame to frame while maintaining the same relative size of like images from frame to frame. The illusion of movement in a plane perpendicular to the axis of the lens of the camera is created in the usual fashion by changing the position of images from frame to frame relative to the axis of the camera lens.

The most widely accepted method for making animations today comprises the preparation of a plurality of generally rectangular transparencies or "acetates," each bearing an opaque image. The transparencies are mounted parallel and flush to each other and in contact with each other with objects of the foreground on top and objects more distant from the foreground positioned therebeneath according to the illusion of depth desired. A photograph is then made of this composite of a plurality of transparencies superimposed on each other. In order to create the illusion of movement in depth, the size of each image moving in depth must be carefully varied from frame to frame in the sequence, the image growing larger as the illusion of approach to the camera lens is generated and growing smaller as the illusion of recession from the lens is generated.

The aforesaid widely accepted method for producing animations has a number of deficiencies. Firstly, there is a practical limit to the total number of transparencies which may be superimposed one above the other for the purpose of making a single photographic frame. This is because light must pass through the topmost transparency and each subsequent transparency in turn and be reflected back to the camera lens. When more than five transparencies are employed, the color characteristics of transparencies more distant from the top are progressively more drastically impaired as is the clarity of images. Thus, in a single frame, objects may be shown only in approximately five planes perpendicular to the axis of the lens of the camera. This limitation frequently produces an unnatural result and, even under the best of conditions, the color characteristics of transparencies more remote from the top are substantially impaired.

Another severe deficinecy of the most widely accepted method of making animations today lies in the generation of the illusion of movement to and from the camera lens. Since the transparencies are superimposed, one upon the other in substantially the same plane, it is necessary to enlarge or reduce like images in sequence from frame to frame in order to create the illusion of movement in depth. This then requires careful and time consuming proportioning of like images. In addition, no shadows can be cast by the images and therefore, shadows must be carefully drawn in. Here again, the size and orientation of shadows from frame to frame vary with like images. The net result is the necessity of drawing all aspects of animation generating the illusion of movement to and from the camera lens in each frame, a process which is time consuming and costly and requires enormous manpower. Moreover, no matter how carefully shadows and reflections are drawn, they can never fully replace natural shadows and reflections.

Therefore, it is among the objects and advantages of our invention to provide apparatus and methods for producing photographic animations wherein a sequence or cycle of an animated image may be employed to generate the illusion of movement in three planes of space wherein like images have the same relative proportions in each member of the sequence thereby eliminating the necessity of changing the proportions of like images from member to member.

Another object of our invention is to provide apparatus and methods for producing photographic animations wherein each animated image casts its own shadow or generates its own reflection on or to a three dimensional scene thereby eliminating the necessity of drawing shadows and reflections.

Still another object of our invention is to provide apparatus and methods for producing photographic animations whrein animated, drawn images may be combined with real objects, either animated or fixed, without the use of optical printers.

Yet a further object of our invention is to provide apparatus and methods for producing photographic animations in which each photographic frame may depict objects, either drawn or real and either animated or fixed in a virtually unlimited number of planes perpendicular to the axis of the lens of the camera and at varying distances therefrom without adversely affecting light or color characteristics of images or objects in planes remote from the camera lens.

The field of our invention may be found in the United States Patent Office in Class 352, sub-classes 48 through 54 and 85 through 89 inclusive. The following United States Letters Patents are broadly related to the field of our invention but do not anticipate the same: 1,296,471, 1,669,407, 1,742,680, 1,859,589, 2,054,414, 2,091,144, 2,198,006, 2,201,649, 2,201,689, 2,281,033, 2,310,254, 2,522,662, 2,591,068, 2,888,857, 3,036,496, 3,228,742.

SUMMARY OF INVENTION

By way of summary, our invention comprises preparing a sequence of images on separate transparent sheets, like images on different sheets of the sequence having the same proportional size, attaching a vertically elongated hanger to the top edge of each sheet, severing each sheet proximally to the image thereon on opposite sides thereof to produce a cut image attached to the aforesaid vertically elongated hanger, movably and adjustably suspending the hanger with the cut image attached thereto in the field of a photographic camera lens, exposing each photographic emulsion in the camera twice, once with a portion of the field of view of the camera lens not including the image masked and once with the remaining portion of the field of view of the camera lens masked, and repeating the aforesaid double exposure of successive frames of photographic emulsion in the camera with cut images in different positions relative to the axis of the camera lens.

By way of summary, our apparatus comprises a jig for positioning cut images in different positions in the three planes of space in the field of view of the camera lens consisting of means for suspending the cut images by hangers in the field of the camera lens at varying distances thereof along its longitudinal axis, means for simultaneously adjustably positioning said cut images in different positions in the field of view of said lens both latitudinally and vertically with respect to the axis thereof, and means for adjustably positioning simultaneously a horizontal member and a vertical member with respect to the camera lens.

By way of further summary, our apparatus comprises hanger means for suspending cut images in the field of view of the camera lens as well as means for adjustably rotating the plane of said cut images about an axial parallel to the vertical axis of the camera lens.

PREFERRED EMBODIMENT OF OUR INVENTION

The aforesaid objects and advantages of our invention as well as other objects and advantages may be achieved by our methods and by the use of our apparatus, at least one embodiment of which is illustrated in the drawings in which.

PREPARATION OF SEVERED IMAGE AND HANGER COMBINATION

Figure 1:
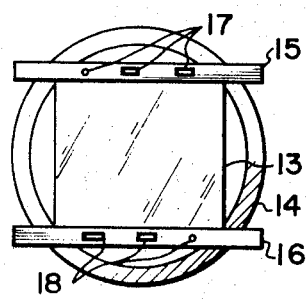
FIG. 1 is a front elevational view of a blank, transparent sheet or acetate mounted on a conventional disc, commonly employed in the art.
Figure 2:
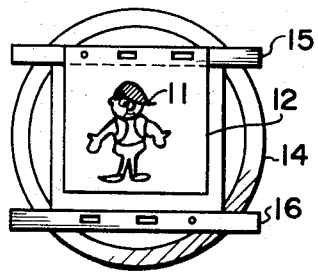
FIG. 2 is a front elevational view of a sheet bearing a tracing of an image overlying the blank, transparent sheet or acetate shown in FIG. 1.
Figure 3:
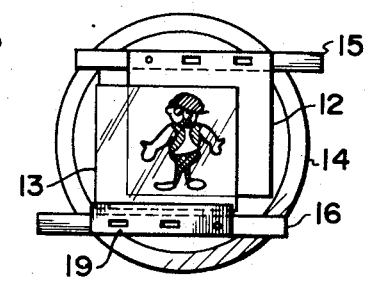
FIG. 3 is a front elevational view of the transparent sheet or acetate with the image of the drawing established thereon overlying the original tracing for purposes of establishing registration.

In order to produce the illusion of movement of some animated image or object such as a running man or the like, it is necessary to prepare a sequence of photographs in the form of motion picture frames of the same image showing various sequential positions of the head, body and limbs. When this sequence is projected rapidly in sequence by a motion picture projector, the illusion of movement is generated. If a particular image is to remain fixed but is not to be merged with the background, a single image may be prepared in the same manner or the fixed image may be prepared as a physical, three dimensional object which becomes part of the fixed scene before the camera lens.

By use of our methods and apparatus, a single sequence of images, each having the same relative proportion with respect to size, may be employed to produce the illusion of movement, not only transverse to the axis of the lens of the camera, but also along the axis thereof. This is in great distinction to existing methods wherein movement along the axis of the lens of the camera can be produced only by changing the relative size of like images throughout the sequence. This procedure becomes necessary since the photographic frame is made by photographing a plurality of transparencies or acetates superimposed one on top of the other and each containing images. Thus, all of the images actually lie substantially within the same plane perpendicular to the axis of the lens of the camera and not in different planes. In our method, the illusion of movement toward or away from the camera lens is produced by photographing images at varying distances from the lens so as to produce a natural augmentation or diminishment of size.

In order to prepare a sequence of images, a plurality of drawings of the animated image are prepared on tracing paper, each drawing representing one of the positions of the image in the sequence or cycle. The precise number of drawings required for each cycle depends upon how rapid and smooth one desires the illusion of movement to be when the sequence is projected through a motion picture projector.

Referring now to drawings 1, 2 and 3 in detail, the image 11 is first drawn by an artist on suitable tracing paper 12 and thereafter established on a blank, transparent sheet or acetate 13 by any one of a number of well known processes which need be detailed no further.

It is highly desirable to establish lateral registration on the transparent sheet or acetate 13 of the image 11 as the image 11 is intended to appear in the overall scene. While there are some apparatus in existence for establishing precise registration of the image 11 as the image 11 is transferred to or established upon the acetate 13, the apparatus is costly and frequently not available. In order to establish latitudinal registration, after the image 11 has been transferred to the acetate 13, the acetate 13 is mounted in a circular frame 14 having a pair of rulers, 15 and 16 slidably mounted thereon in general parallelism. Each of the rulers 15 and 16 is provided with a plurality of guide pegs, respectively 17 and 18. In order to establish the same latitudinal registration of the image 11 on the acetate 13 as the image appeared on the initial tracing 12, the acetate 13 is laid over the tracing 12 which is pre-affixed to the top ruler 15 by means of guide pegs 17. When the image on the tracing 12 coincides with the image 11 on the acetate 13, an adhesive or glue-backed tape 19 having perforations 20 corresponding to the guide pegs 18 on the bottom ruler 16 is affixed to the bottom of the acetate 13, the perforations 20 being in registration with the pegs 18. By matching the scale associated with the top and bottom rulers 15 and 16, before applying the tape 19, the image 11 on the acetate 13 may be given the same relative latitudinal registration with respect to the ruler 16 as the image on the tracing 12 were to ruler 15. Subsequently, this precise latitudinal registration is transferred to hanger means and may be thereafter carried through to jig means so that the position of the image 11 before the camera lens may be identical to that planned in the scene of the initial tracing.

Figure 4:
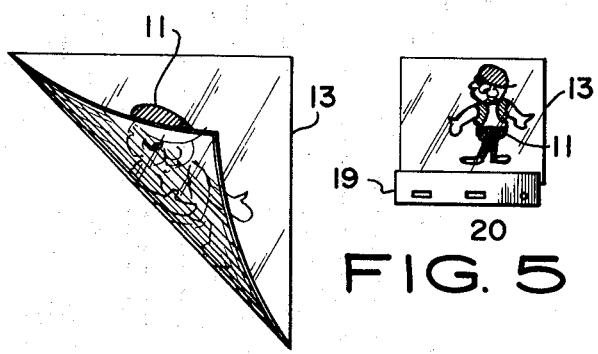
FIG. 4 is a view in perspective of a transparent sheet with a fully colored and finished image established thereon.
Figure 5:
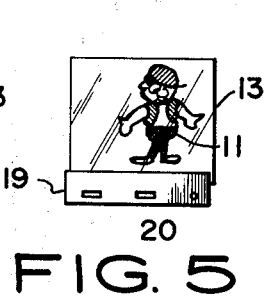
FIG. 5 is a front elevational view of a transparent sheet or acetate with the image fully established thereon to which a registration tab has been attached.

FIG. 4 illustrates the acetate 13 upon which the image 11 has been established. Of course, after the outline of image 11 has been established on the acetate, the acetate may be colored by any one of a number of well known techniques which need be described no further.

Figure 13:
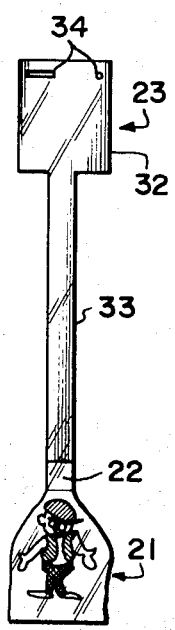
FIG. 13 is a front elevational view of an image severed from the transparent sheet upon which it was established and attached along its topmost edge to the thinner of the elongated hangers illustrated in FIG. 6.

The ultimate object of our invention is to suspend that portion of the acetate 13 bearing the image 11 before the lens of a camera and photograph the same. In order to realize this object, we contemplate attaching transparent hanger means to the acetate 13 and thereafter severing the image 11 from the acetate 13 to produce a cut image 21 as illustrated in FIG. 13.

Figure 6:
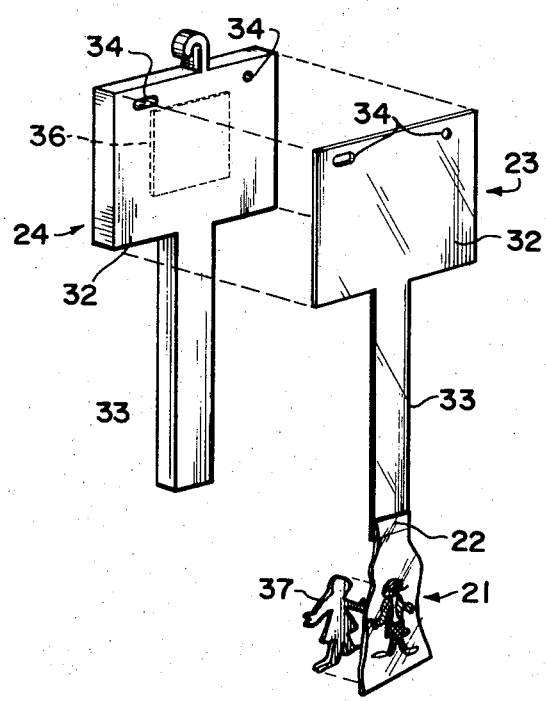
FIG. 6 is a view in perspective of a first and second transparent hanger member adapted to be fixedly secured to each other with a severed portion of the transparent sheet bearing the image attached to the thinner of the two transparent hanger members.
Figure 7:
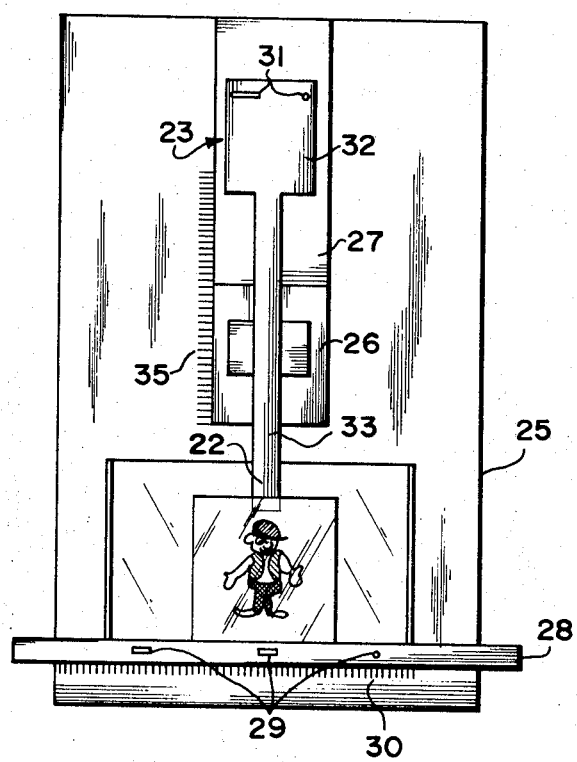
FIG. 7 is a front elevational view of the hangers shown in FIG. 6 mounted on a mounting board to establish vertical registration of the image before securing the image to the thinner of the said hangers.

Referring now in detail to FIGS. 6 and 7, our hanger means comprise a first, relatively thin, flexible, transparent hanger 23 and a second, relatively more thick and rigid but nevertheless transparent hanger 24. Hangers 23 and 24 have precisely the same shape and size.

The first hanger 23 is secured to the acetate 13 by means of the mounting board 25 illustrated in detail in FIG. 7. By use of our mounting board 25, the vertical registration of the image 11 may be established and means for transferring latitudinal registration of the image precisely transferred to the jig in which the hangers will be detachably mounted thereafter.

The mounting board 25 is provided with a generally rectangular, recessed channel 26 having a block 27 slidably mounted therein. A ruler 28 is slidably mounted in an appropriate channel at the bottom of mounting board 25 generally perpendicular to the channel 26. The ruler 28 is provided with guide pegs 29 in precise relative registration to the guide pegs 18 on ruler 16. An appropriate scale 30 on the mounting board 25 adjacent to the ruler 28 facilitates transfer of lateral registration to the jig to be hereinafter described.

The block 27, slidably engaged in channel 26 of the mounting board 25, is provided with a plurality of guide pegs 31. The first and second transparent hangers 23 and 24, respectively, are identical in external shape and consist of a generally square top section 32 and an elongated, generally rectangular bottom section 33. Each of the top sections 32 of the respective hangers 23 and 24 are provided with perforations 34 in registration with and for engagement with the guide pegs 31 on block 27.

The sliding block 27 is employed to establish vertical registration of the image 11. In order to establish vertical registration, the first hanger 23 is mounted on the sliding block 27 with guide pegs 31 extending through perforation 34. The elongated, generally rectangular bottom section 33 of hanger 23 extends downwardly to and overlaps a portion of the acetate 13 positioned therebeneath. The acetate 13 is mounted on the ruler 28 by means of guide pegs 29. By sliding ruler 28 in its channel, the image 11 may be positioned directly beneath the bottom portion 33 of hanger 23. When the image is so positioned, the terminal end of bottom portion 33 is secured to the acetate 13 by any suitable means such as a plastic spray, adhesive, glue or the like. The position of ruler 28 relative to scale 30 is noted so that latitudinal registration may be maintained in the jig to be hereinafter described.

The scale 35 extending along the longitudinal edge of channel 26 may be employed to establish vertical registration of image 11 to correspond to the intended vertical registration of image 11 in the original scene tracing.

After the bottom portion 33 of hanger 23 has been secured to the acetate 13, the acetate 13 is cut proximally to the image 11 to produce a cut or severed image 21. The acetate 13 is reduced or cut down to size as much as possible immediately above the image 11 thereby defining an elongated vertical tab 22 which has been pre-affixed to the bottom portion 33 of hanger 23. The cut image 21 with the hanger 23 connected or attached thereto is shown in detail in FIG. 13.

The first hanger 23 is relatively thin and flexible for ease of handling. However, it is the intendment of our process to suspend the hanger means from a suitable rack such that the image 11 depends before a camera lens. Thus, it is necessary to insure that the cutter severed image 21 hangs straight. In order to insure this, a second, transparent but relatively more thick and rigid hanger 24 is secured to hanger 23. In order to insure precise registration between hangers 23 and 24, hanger 24 may be mounted on block 27 in mounting board 20 with pegs 31 extending through perforations 34. The hanger 24 may then be sprayed with a suitable glue or adhesive and the thinner hanger 23 applied thereto with pegs 31 extending through its perforations 34 thereby maintaining precise registration.

Hanger 24 provides the requisite rigidity to hanger 23 to insure that the bottom portion 33 of each of the two hangers 23 and 24 depends straight and true. However, neither bottom portion 33 of hangers 23 and 24 extends downwardly over the image 11 on the acetate 13. Since the acetate 13 is thin and flexible, there is some danger that the acetate may tend to warp. To prevent this, a weight 37 is applied to the rear of the image 11 on the acetate 13 to provide sufficient weight so that the acetate 13 and image 11 thereon are gravitationally straightened to hang true beneath the bottom portions 33 on hangers 23 and 24.

We have found that hangers 23 and 24 may be secured together by means of an acrylic plastic which is presently provided in spray cans. This same acrylic plastic may be employed to secure the acetate 13 to the bottom portion 33 of the first hanger 23. The acrylic plastic spray is clear and uncolored and extremely compatible with the material from which the hangers are fabricated.

THE MOUNTING JIG

Our invention contemplates hanging or suspending the severed or cut images 21 by means of the hangers (hereinafter collectively referred to as hanger 24) in the field of view of a camera lens. In order to generate the illusion of movement, a sequence of photographs must be made of the severed or cut images 21 in different positions in the three planes of space in the field of view of the camera lens. In order to provide for this process, we have developed a unique jig which supports the hangers 24 in the field of view of the camera lens and permits rapid changing of the position of the hangers in a direction along the axis of the lens of the camera as well as changing the relative position of the image with respect to both the axis of the camera lens and the background or foreground of a fixed scene. Our jig 38 is illustrated in detail in FIGS. 8, 9 and 10. The jig 38 comprises basically means for suspending the hanger 24 in any one of a large number of planes generally perpendicular to the axis of the lens of the camera and for adjustably positioning the hanger 24 latitudinally with respect to the axis of the lens of the camera. In addition, our jig 38 comprises basically means for simultaneously moving ground and background scenery, both parallel to the axis of the lens of the camera and perpendicular thereto while simutlaneously maintaining identical lighting characteristics. The movement of ground and background scenery is independent of movement of the hangers 24.

Figure 8:
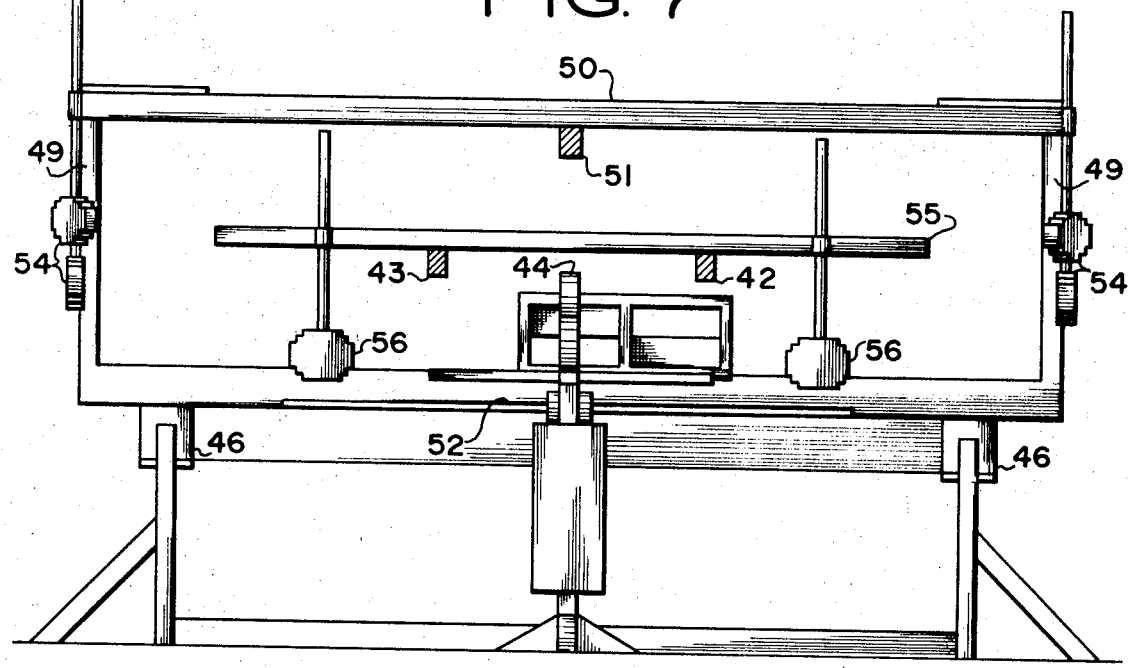
FIG. 8 is a front elevational view of a mounting jig and camera assembly.
Figure 9:
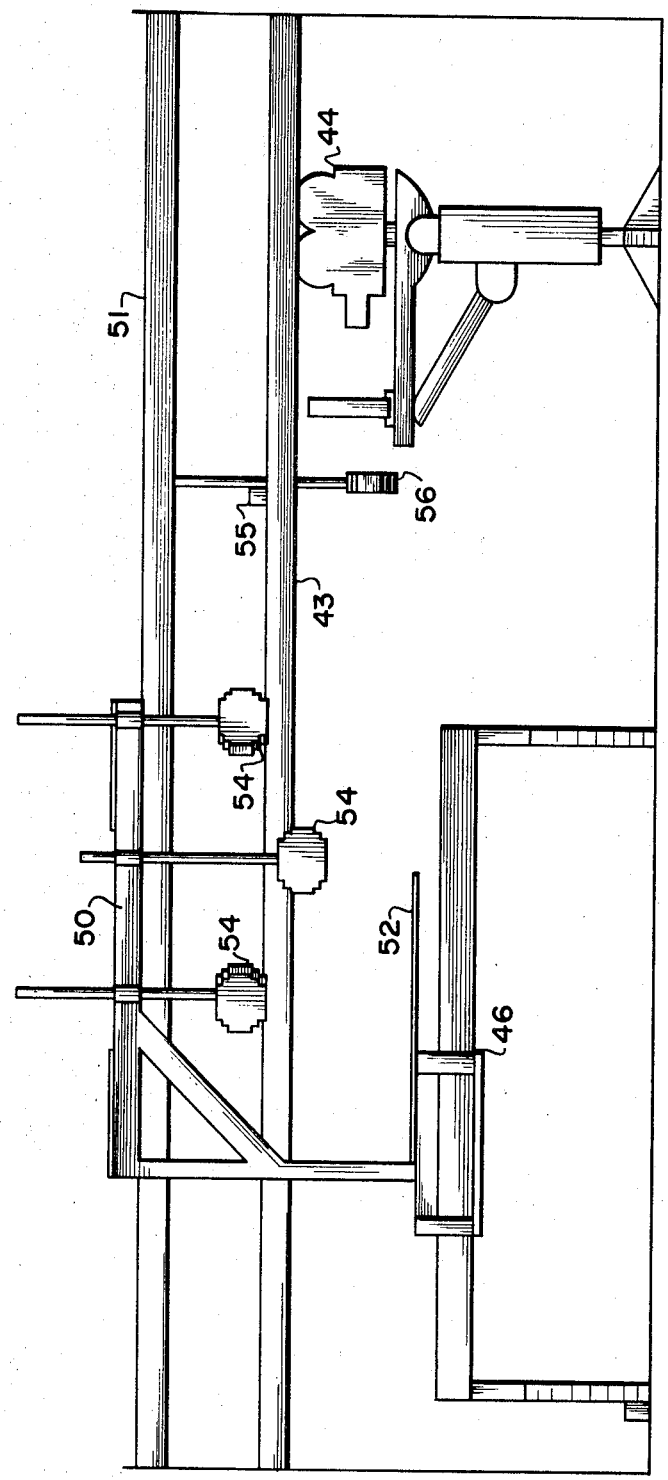
FIG. 9 is a side elevational view of the mounting jig and camera assembly shown in FIG. 8.
Figure 10:
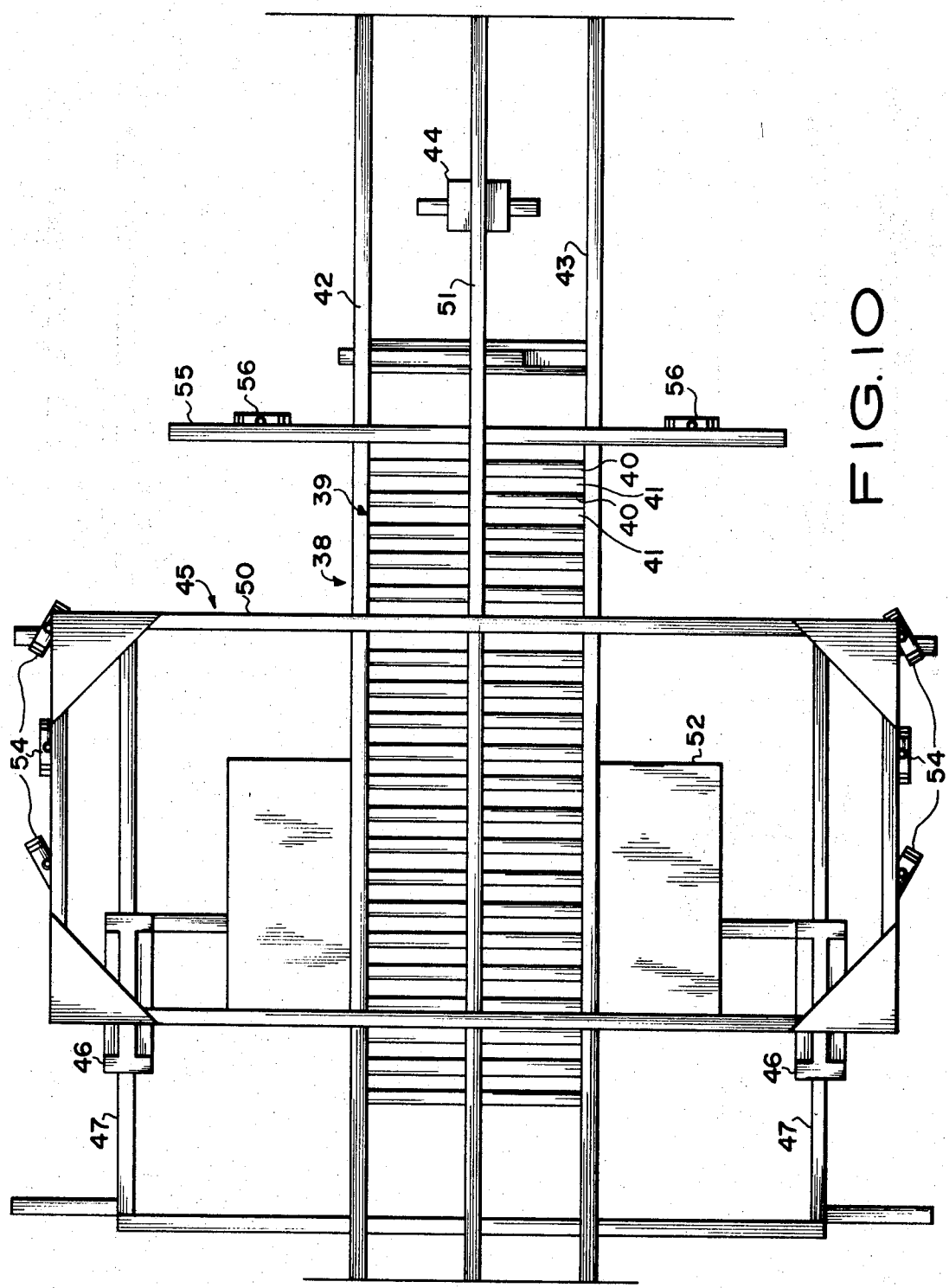
FIG. 10 is a top plan view of the mounting jig and camera assembly aforesaid.

Referring now to FIGS. 8, 9 and 10 in detail, our jig 38 comprises an overhead rack 39 having a plurality of generally parallel, spaced apart bars 40 defining slots 41 therebetween.

The bars 40 are mounted between a pair of spaced apart, generally parallel, elongated rails 42 and 43. The rack 39 is oriented such that the axis of the lens of the camera 44 generally bisects each of the bars 40 and is perpendicular thereto.

The rack 39 is adapted to suspend hangers 24 in a manner which will be described in greater detail later.

A carrier 45 is mounted in the field of view of the camera 44 and is adapted to move both perpendicular and parallel to the axis of the lens of the said camera. The carrier 45 comprises a pair of grooved, slides mounted on top of a pair of generally parallel, spaced apart supporting rails 47, 47. The supporting rail 47, 47 are generally parallel to and bisected by the axis of the lens of the camera 44. A horizontal cross-member 48 is rigidly mounted to and between the grooved slides 47, 47. A second cross member 64 is slidably mounted on the first cross member 48 and defines the bottom rail of a generally rectangular, vertically extending frame. A pair of generally parallel, vertically extending end-posts 49, 49 are rigidly attached to opposite ends of the second cross member 64 and support on their top ends, a horizontal, generally rectangular, rigid frame 50. The frame 50 extends over a central support rail 51 and slidably rests thereon.

A floor 52 which provides the ground for the field of view of the camera 44 extends horizontally from the second cross member 64 toward the camera 44. However, the floor 52 may extend rearwardly away from the camera as well.

The rear 53 of the enclosure in which our jig 38 is mounted may function as a backdrop.

The frame 50 of the carrier 45, supports a plurality of depending lights 54 for illumination of the scene therebetween. The lights 54 are rotatable to provide for a wide variety of lighting characteristics. A second cross member 55 mounted on the rack 39 may also support additional lights 56 for illumination of the scene or the back-drop 53.

There is, thus, provided, rack means for suspending the severed or cut images 21 by means of hanger 24 in the field of view of the camera 44 at varying distances from the camera lens which distances may be altered in very small increments. There are also provided means for moving the ground 52 and anything mounted on the ground both parallel and perpendicular to the axis of the lens of the camera 44. Of course, vertical positioning of the image 11 is governed by properly mounting the first hanger 23 to the acetate 13.

Figure 11:
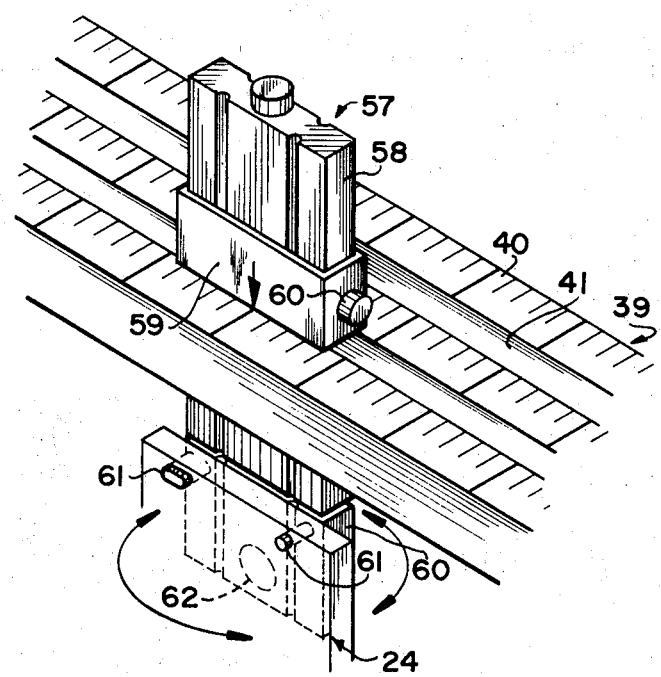
FIG. 11 is a view in perspective of a hanger support slidably mounted to a portion of the mounting jig and illustrating the rotatably adjustable bottom portion thereof.
Figure 12:
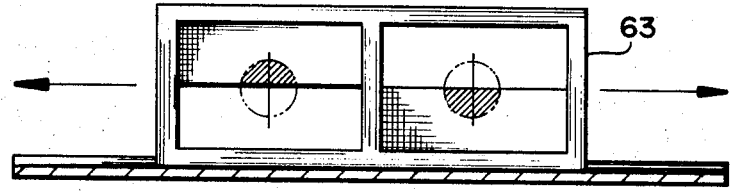
FIG. 12 is a front elevational, schematic view of one form of lens mask adapted for use with the camera in the mounting jig and camera assembly.

In FIG. 11, we have illustrated in detail, the means for suspending hanger 24 from the rack 39.

The means comprises a special mount 57 defining a relatively thin block 58 just sufficiently thick to pass through slots 41 in the rack 39. A rectangular collar 59 surrounds the block 58 and overlaps the bars 40 of the rack 39. A set screw 60 secures the collar 59 to the block 58.

A rotatable member 60 is pivotally mounted about a vertical axis at the bottom of the block 58. The rotatable member 60 is provided with a pair of guide pins 61, 61 which are adapted for registration with the perforations 34, 34 in the hangers 23 and 24. The rotatable member 60 is also provided with a magnetic element 62 adapted to magnetically attract the magnetically attractable tape 36 on the second hanger 24. Thus, the hangers 23 and 24 may be mounted on guide 61, 61 and be held in place by magnetic 62. In this manner, the severed or cut image 21 depending from the bottom of the hanger means is suspended in the field of view of the camera. It should be borne in mind, however, that the tape 19 which was placed on the bottom of the acetate 13 in order to insure proper latitudinal registration of the image is removed before the hanger is suspended in front of the camera. This prevents the bottom-most edge of the acetate 13 and tape 19 from striking the floor 52.

OPERATING PROCESS

In operation, a back-drop scene may be mounted on the enclosure surrounding the entire jig assembly or be attached to the carrier 45. The manner of preparing a sequence or cycle of animations has previously been described. There remains the actual photographing of each image 11 of the sequence in proper position in the jig before the lens of the camera 44.

In order to prepare a particular photographic frame, a hanger 24 is attached to the rotatable member 60 of the mount 57 by means of the guide pins 61, 61 which are in the same position as the corresponding perforations 34, 34 of the hanger 24. The magnet 62 attracts the magnetically attractable tape 36 on the hanger 24 and thereby detachably secures the hanger 24 to the rotatable member 60 against accidental dis-engagement. The particular slot 41 in which the mount 57 is positioned is determined by the distance that the image 11 should be from the lens of the camera 44. The latitudinal position of the mount 57 in the rack 39 is determined by means of scales applied to the top of each bar 40. It will be recalled that the acetate 13 with the image 11 established thereon was provided with a perforated tape 19 so as to transfer the registration of the image 11 from its original position in the tracing 12 to the ruler 58 in the mounting board 25. The scale 30 on the mounting board corresponds to the scale on the top of each of the cross-bars 40 of the rack 39. Thus, the position of the image 11 on the original tracing 12 may be transferred through rulers 16 and 58 to the scale on the top of the cross-bars 40. The value picked from scale 30 on the mounting board is matched to the same value on the scale on top of the cross-member 40 thus, transferring proper registration in a plane perpendicular to the axis of the lens of the camera 44. Vertical registration has already been established by a sliding block 27 in the mounting board 25 as previously described.

It is vital that light reflections from the surface of that portion of the acetate 13 containing the image 11 not be directed at the lens 44. Thus, the rotatable member 60 may be adjusted to direct any potential reflections away from the lens of the camera as well as maintain the plane of the image 11 tangent to the arc defined by the radius extending from the center of the camera lens to the center of the plane of the image 11.

The carrier 45 may be adjusted both parallel and perpendicular to the axis of the lens of the camera 44 as desired to control foreground, ground and background scene components.

The total scene is now ready for photographing. Each photographic frame is exposed twice. During each exposure, portion of the scene is masked by a slidable mask 63 mounted in front of the camera 44. During one exposure, the mask 63 obscures at least the bottom portion 33 of the hanger 24 extending into the field of view of the camera 44 so that only the image 11 and that portion of the scene generally beneath the level of the obscuring mask is then recorded on the film.

After the image 11 has been exposed on the photographic frame, the mount 57 with the hanger secured thereto is removed from the rack 39. Thus, the image 11 has been removed from the field of view of the camera 44. A second mask 63 which now obscures all portions of the frame previously photographed, is placed in position in front of the camera lens. The film is then exposed for a second time recording those portions of the scene obscured previously by the first mask. However, when this second exposure is made, the bottom portion 33 of the hanger 24 is no longer visible since the hanger has been removed and, therefore, a clear scene is recorded without picking up any residual image of the hanger.

It should be borne in mind that the camera 44 is focused on the scene in the jig but the masks 63 are relatively close to the lens and, therefore, considerably out of focus. This soft focus on the edge of the mask extending across the field of view of the camera lens insures that no sharp, well-defined line between the two exposures will be recorded on the photographic frame.

A single photographic frame has now been produced which shows the image in one position. In order to create the illusion of movement of this image, the position of the image is changed before exposing the next frame. Of course, the image itself may change slightly so as to create the illusion of movement of integral parts thereof. For instance, if the animated image were a running man, the head, body and in particular the limbs would change from frame to frame in the natural manner of a running man. The position of the image relative to the scenery is changed by securing the next image of the sequence to a mount 57 and hanging the image at a new and different position both parallel and perpendicular to the axis of the lens of the camera 44. The vertical position of the image may also be changed if desired by adjusting the length of the bottom portion 33 of the hanger 24. The carrier 45 may also be adjusted both parallel and perpendicular to the axis of the lens of the camera to generate the illusion of movement of the camera eye which is the eye of the observer with respect to both fixed and moving objects.

Once the position of animated images and fixed objects as well as background, foreground and ground scenery have been established for the next frame, a second double exposure is made in the manner described before.

The same procedure is repeated for each frame comprising part of the animation and the frames projected rapidly in sequence by a motion picture projector to create the illusion of movement.

Now, it may be easily appreciated that our invention provides means for creating the illusion of movement to and from the camera lens with a sequence of images in which like images in each member of the sequence have the same relative size. Since each image may be suspended at a different distance from the camera lens, there is a natural, optical diminution, or augmentation in size produced by the ordinary optics of the lens. Thus, it is unnecessary to reduce the relative size of like images from frame to frame in a particular sequence to create the illusion of movement in depth. This is particularly important since a relatively few number of drawings of a particular image may be sequentially interarranged to produce a very wide variety of movements including movement in depth to or from the camera lens. This is impossible in existing systems.

It may now also be appreciated that each image 11, being opaque, will cast its own natural shadow on scenery as well as on other objects or images, fixed or animated. There is absolutely, no need to draw a shadow. No matter where the image may be from frame to frame, the shadow will change naturally since this shadow actually photographed is a virtual shadow and not a drawn shadow. The same may be said with respect to reflections of images 11.

As an added advantage of our process and apparatus, objects, both animated and fixed, may be placed in a very large number of different planes at varying distances from the lens of the camera 44 without impairng color characteristics of objects in the more remote planes. It is also relatively easy to produce a background lighted scene with the foreground relatively dark which is virtually impossible in the systems used today. Still further, animated, drawn images may be combined with real objects, in a natural scene without the use of optical printers.

Interesting lighting effects may be obtained by our process and apparatus since the lights on the carrier 45 may be directed at intermediate objects while leaving both foreground and background relatively dark. This too, is next to impossible to produce with known methods.

Thus, it now may be well appreciated that our methods and apparatus enable one to produce animations in substantially less time with less costs and less manpower than before. Moreover, the animations produced are more real and natural and may include a much wider variety of interesting lighting characteristics than has been possible in the past.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

We claim:
1. A method for producing animations comprising,
 (a) preparing a sequence of images on separate transparent sheets,
 (b) attaching a vertically elongated hanger to the top edge of each sheet,
 (c) severing each sheet proximally to the image to produce a cut image with the hanger secured thereto,
 (d) suspending each cut image by the hanger sequentially in the field of view of a lens of a camera,
 (e) exposing a frame of photographic emulsion through said lens twice, once with the cut image projected by the lens on the emulsion with at least the hanger masked out and again with the previously exposed portion of the field of view masked out and the previously masked portion projected on the emulsion,
 (f) repeating the aforesaid double exposure of subsequent frames of the photographic emulsion sequentially with cut images suspended by hangers in different positions to produce the illusion of movement of the cut image.
2. A method for producing animations comprising,
 (a) the method in accordance with claim 1, in which,
 (b) like images on each sheet of a sequence are the same proportional size.
3. A method for producing animations comprising,
 (a) the method in accordance with claim 1, in which,
 (b) the lines of demarkation between exposed portions and masked portions of each frame are softly out of focus on the emulsion.
4. A method for producing animations comprising,
 (a) the method in accordance with claim 1 in which,
 (b) each cut image is movably and adjustably suspended in the field of view of the camera lens.
5. A method for producing animations comprising,
 (a) the method in accordance with claim 1, and
 (b) rotatably orienting each cut image about its vertical axis to direct reflections therefrom away from the camera lens.
6. A method for producing animations comprising,
 (a) the method in accordance with claim 1 and,
 (b) movably suspending scenery means in the field of view of the camera lens, the said scenery means being movable independently of the suspended cut image.
7. A method for producing animations comprising,
 (a) the method in accordance with claim 6 and,
 (b) movably suspending light means directable at the field of view of the camera lens, the light means being movable in coincidence with the scenery means.
8. A method for producing animations comprising,

(a) the method in accordance with claim 6 in which,
(b) the scenery means are movable simultaneously in directions both perpendicular and parallel to the axis of the camera lens.

9. A method for producing animations comprising,
(a) the method in accordance with claim 1, and,
(b) attaching weight means to opaque portions of the cut image on the side opposite the camera means before suspending the same in the field of view of the camera means.

10. A method for producing animations comprising,
(a) the method in accordance with claim 1 and,
(b) adding stiffening means to the hanger to cause the same to depend under the influence of gravity in a substantially vertical plane.

11. A method for producing animations comprising,
(a) the method in accordance with claim 2 in which
(b) the lines of demarkation between exposed portions and masked portions of each frame are softly out of focus on the emulsion.

12. A method for producing animations comprising,
(a) the method in accordance with claim 2 in which
(b) the lines of demarkation between exposed portions and masked portions of each frame are softly out of focus on the emulsion and
(c) rotatably orienting each cut image about its vertical axis to direct reflections therefrom away from the camera lens.

13. A jig for producing animations comprising,
(a) a first support for mounting a camera,
(b) a scenery carrier for moving scenery toward and away from the camera,
(c) a second support mounted above and spaced away from said scenery carrier a distance sufficient to lie above the field of view of said camera,
(d) the second support consisting of a plurality of generally horizontal, parallel, spaced apart bars extending at the angle to the optical axis of the said camera and defining a plurality of parallel slots therebetween,
(e) a vertically adjustable hanger for detachably and movably suspending an image bearing member from said second support, said hanger being suspended on said bars and depending vertically downwardly through said slots at varying distances from the camera lens and movable laterally with respect to said optical axis, and
(f) means for moving said scenery carrier toward and away from the camera independently of said second support.

14. A jig for producing animations comprising,
(a) the structure in accordance with claim 13, and
(b) a frame attached to the scenery carrier for movement therewith, the frame lying outside of the field of view of the camera, and
(c) illumination means attached to the frame illuminating the scenery on the carrier.

15. A jig for producing animations comprising,
(a) the structure in accordance with claim 13, in which
(b) a portion of the hanger beneath the second support being pivotal about a vertical axis.

16. A hanger for suspending images before a camera lens to produce animations comprising,
(a) a first, flat, relatively thin elongated transparent member,
(b) an enlargement on one end of the said first transparent member, the enlargement having at least one opening for effecting registration of the first transparent member with a second member,
(c) a second, flat, relatively thick, and rigid elongated transparent member, shaped to conform to but shorter than the first said member,
(d) an enlargement on one end of the said second transparent member,
(e) at least one registration post on the enlargement on the second transparent member for each opening in the enlargement on the first transparent member, each post extending generally perpendicular to the plane of the second transparent member and shaped and dimensioned to snugly pass through an opposed opening on the first transparent member when the first and second transparent members are engaged and in peripheral registration with each other, and
(f) means for detachably attaching the first and second transparent members together in peripheral registration.

17. A hanger for suspending images before a camera lens to produce animations comprosing,
(a) the structure in accordance with claim 16 and
(b) a thin, flat, image bearing member detachably secured to the end of the first transparent member opposite the said enlargement.

References Cited

UNITED STATES PATENTS

| | | | |
|---|---|---|---|
| 2,075,684 | 3/1937 | Whitman | 352—50.4X |
| 2,091,144 | 8/1937 | Freil | 352—52 |
| 2,168,041 | 8/1939 | O'Grady | 352—235OX |
| 2,201,649 | 5/1940 | Fleischer | 352—52 |
| 2,551,955 | 5/1951 | Levine | 352—99OX |
| 2,862,331 | 12/1958 | Oppenheimer | 352—88OX |
| 2,279,241 | 4/1942 | Musaphia | 352—87 |
| 2,312,158 | 2/1943 | Garity | 352—87OX |
| 3,329,476 | 7/1967 | Whitney | 352—90OX |

JOHN M. HORAN, Primary Examiner

M. H. HAYES, Assistant Examiner

U.S. Cl. X.R.

95—85; 352—46, 49, 52, 54, 87, 88